(12) United States Patent
Campbell

(10) Patent No.: US 11,785,955 B2
(45) Date of Patent: Oct. 17, 2023

(54) MEAT PROCESSING SYSTEM

(71) Applicant: SCOTT AUTOMATION & ROBOTICS PTY LIMITED, Rydalmere (AU)

(72) Inventor: Clyde Mark Campbell, Mosman (AU)

(73) Assignee: SCOTT AUTOMATION & ROBOTICS PTY LIMITED, Rydalmere (AU)

( * ) Notice: Subject to any disclaimer, the term of this patent is extended or adjusted under 35 U.S.C. 154(b) by 0 days.

(21) Appl. No.: 17/786,468

(22) PCT Filed: Dec. 15, 2020

(86) PCT No.: PCT/AU2020/051368
§ 371 (c)(1),
(2) Date: Jun. 16, 2022

(87) PCT Pub. No.: WO2021/119731
PCT Pub. Date: Jun. 24, 2021

(65) Prior Publication Data
US 2023/0045592 A1 Feb. 9, 2023

(30) Foreign Application Priority Data

Dec. 20, 2019 (NZ) ........................................ 760211

(51) Int. Cl.
*A22B 5/00* (2006.01)
*A22C 17/00* (2006.01)
*B26D 7/06* (2006.01)

(52) U.S. Cl.
CPC ........ *A22B 5/0029* (2013.01); *A22C 17/0006* (2013.01); *B26D 7/0625* (2013.01)

(58) Field of Classification Search
CPC .. A22B 5/0029; A22C 17/0006; B26D 7/0625
See application file for complete search history.

(56) References Cited

U.S. PATENT DOCUMENTS 3,916,484 A * 11/1975 Kennedy .............. A22B 5/0058
452/159
4,597,132 A 7/1986 Elmer et al.
(Continued)

FOREIGN PATENT DOCUMENTS

AU 2011205155 A1 3/2012
CA 2288500 A1 5/2000
(Continued)

OTHER PUBLICATIONS

International Search Report and Written Opinion for PCT/AU2020/051368 (dated Mar. 1, 2021).
(Continued)

*Primary Examiner* — Richard T Price, Jr.
(74) *Attorney, Agent, or Firm* — Merchant & Gould P.C

(57) ABSTRACT

A meat processing system comprising a blade, a blade movement assembly, a controller and a conveyor. The blade is configured to cut a carcass into pieces and lies substantially in a blade plane. The conveyor is configured to move the carcass along a first axis. The controller is configured to control the blade movement assembly to rotate the blade or a portion of the blade to vary an angle between the blade plane and the first axis. The blade movement assembly may also be configured to translate the blade to move the blade transverse to the first axis. A method of operating a meat processing system is also disclosed. The method includes conveying a carcass or section of carcass along a first axis, controlling a blade movement assembly to rotate a blade or a portion of a blade to vary the angle between a blade plane and the first axis, and cutting the carcass or section of carcass into pieces.

19 Claims, 6 Drawing Sheets

(56) References Cited

U.S. PATENT DOCUMENTS

| | | | |
|---|---|---|---|
| 5,411,434 A | 5/1995 | McGoon et al. | |
| 6,032,305 A | 3/2000 | Tedrick | |
| RE36,664 E * | 4/2000 | O'Brien | A22B 5/0029 |
| | | | 452/157 |
| 6,692,345 B1 | 2/2004 | Krüger | |
| 8,096,860 B2 | 1/2012 | Bolte et al. | |
| 8,764,525 B2 | 7/2014 | Peters et al. | |
| 9,955,702 B1 * | 5/2018 | Driscoll | A22B 5/0041 |
| 2004/0058636 A1 | 3/2004 | Hinsch et al. | |
| 2006/0053543 A1 | 3/2006 | Vargas et al. | |
| 2007/0209104 A1 | 9/2007 | Buzzetti et al. | |
| 2009/0215369 A1 | 8/2009 | Busch | |
| 2010/0304652 A1 | 12/2010 | Bolte et al. | |
| 2012/0040597 A1 * | 2/2012 | Fern | G01N 33/12 |
| | | | 901/14 |
| 2018/0153179 A1 * | 6/2018 | Driscoll | A22B 5/208 |

FOREIGN PATENT DOCUMENTS

| | | |
|---|---|---|
| EP | 0594528 A2 | 4/1994 |
| EP | 0985348 A2 | 3/2000 |
| EP | 1868443 B1 | 11/2010 |
| FR | 2718072 B3 | 10/1995 |
| GB | 2579410 A | 6/2020 |
| WO | 2015/079039 A1 | 6/2015 |
| WO | 2016/139611 A2 | 9/2016 |

OTHER PUBLICATIONS

International Preliminary Report on Patentability for PCT/AU2020/051368 (dated Jul. 5, 2021).

Search Report for European Patent Application No. 21841780.6 (dated Jul. 6, 2023).

* cited by examiner

MEAT PROCESSING SYSTEM

This application is a National Stage Application of PCT/AU2020/051368, filed Dec. 15, 2020, which claims benefit of priority to Application No. 760211, filed Dec. 20, 2019, in New Zealand, and which applications are incorporated herein by reference. To the extent appropriate, a claim of priority is made to each of the above disclosed applications.

FIELD

This invention relates to a meat processing system. This invention also relates to a method of operating a meat processing system.

BACKGROUND

Various methods of processing carcasses to obtain meat exist. Manual processing may allow a high degree of control over cut position and shape, but it is slow and expensive to scale up to commercial meat processing volumes.

Mechanised processing may be faster and more suited to commercial-scale implementation than manual processing. However, mechanised systems may be relatively limited with regard to how carcasses are cut.

Robotic arms may be used to cut a carcass at various angles. However, these may require articulated components with many degrees of freedom and sophisticated control algorithms. These may therefore be costly and complex. Robotic arm-based systems may also not be suited to cutting right through a carcass on a conveyor to separate the carcass into pieces.

SUMMARY

According to one example embodiment there is provided a meat processing system comprising: a blade configured to cut a carcass or section of carcass into pieces, the blade lying substantially in a blade plane; a blade movement assembly; a controller; and a conveyor configured to convey the carcass or section of carcass along a first axis; wherein the controller is configured to control the blade movement assembly to rotate the blade or a portion of the blade to vary an angle between the blade plane and the first axis.

Embodiments may be implemented according to any one of the dependent claims 2 to 29.

According to another example embodiment there is provided a method of operating a meat processing system comprising: conveying a carcass or section of carcass along a first axis; controlling a blade movement assembly to rotate a blade or a portion of a blade that lies in a blade plane to vary an angle between the blade plane and the first axis; and cutting the carcass or section of carcass into pieces while the carcass or carcass is conveyed along the first axis and while the blade plane is at an angle to the first axis.

Embodiments may be implemented according to any one of the dependent claims 31 to 35.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

BRIEF DESCRIPTION OF THE DRAWINGS

The accompanying drawings, which are incorporated in and constitute part of the specification, illustrate embodiments of the invention and, together with the general description of the invention given above and the detailed description of embodiments given below, serve to explain the principles of the invention.

DETAILED DESCRIPTION

In mechanised meat processing systems in which a carcass or section of carcass is cut while being conveyed, it may be useful to be able to control the path taken by a blade through the carcass. This is because carcasses can be disposed in various orientations and positions while being conveyed past the blade. If a blade is fixed with respect to the conveyor, it will cut different sections of carcass differently depending on their respective orientations and positions. This may result in wasted meat and inconsistent sizes and shapes of cut pieces.

A blade could move laterally with respect to the direction that a carcass on a conveyor moves past the blade to cut along a path at an angle to the direction of movement. However, because the blade is generally planar (at least in the region that performs the cut), there are problems associated with moving it laterally because the plane in which the blade sits is at a fixed angle, such as 0°, to the direction of movement of the carcass. These problems include increased resistance to cutting at an angle; large lateral forces between the carcass and the blade due to the broad side of the blade moving through the carcass; limitation of the maximum angle that the blade can follow through the carcass due to the carcass's resistance to the blade moving laterally at high speeds; and wastage of meat. These problems occur because the plane of the blade is not aligned with the cutting path and presents a wide leading surface as it moves along the cutting path through the carcass.

Figure 1:
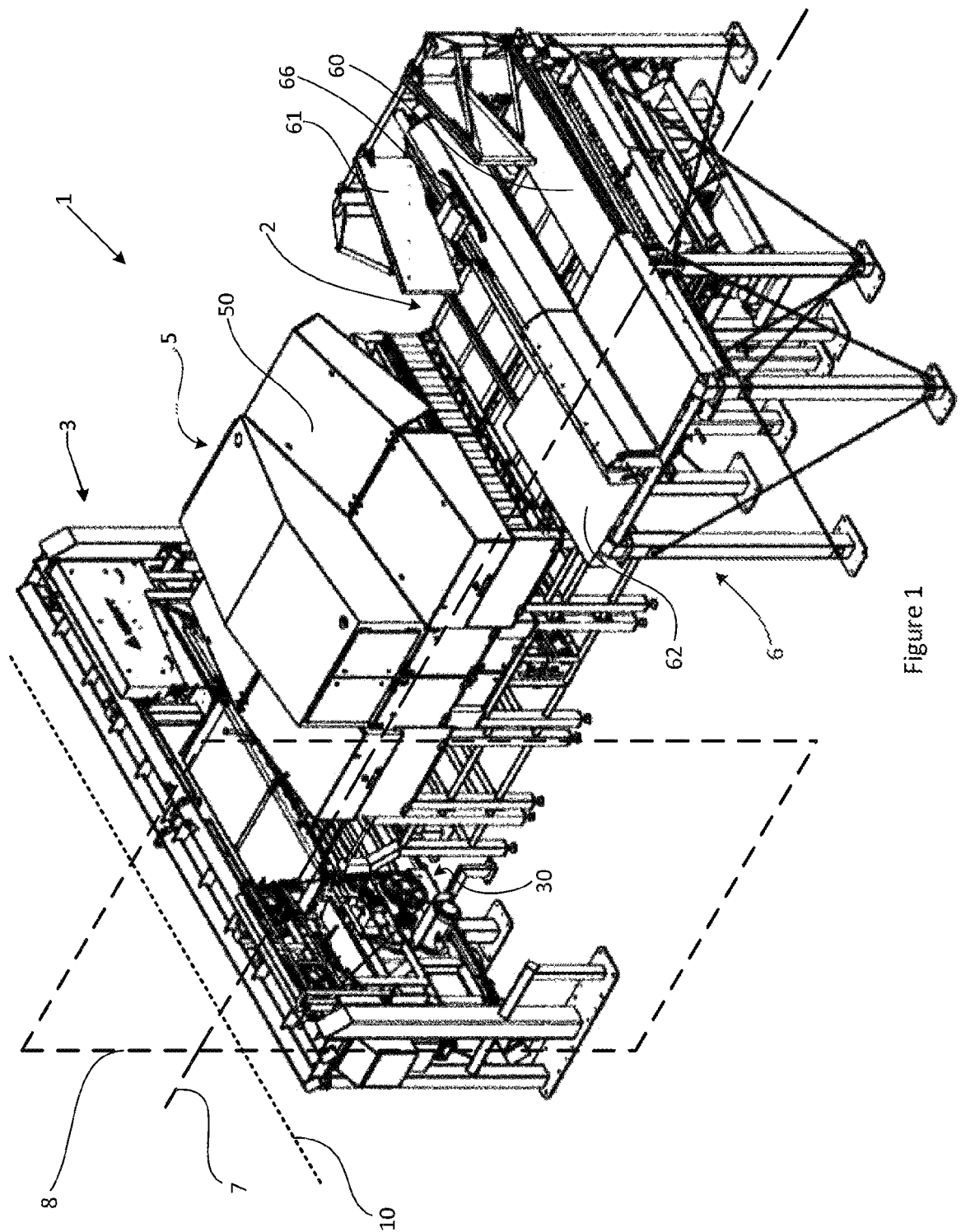
FIG. 1 is an isometric view of a meat processing system in accordance with one example.

FIG. 1 illustrates a meat processing system 1 according to an example embodiment. This system 1 includes three main sections: a feeder 6 that receives the carcass to be processed and feeds it to the rest of the system 1; a machine vision system 5 that analyses the position and orientation of the carcass and of its bones; and a cutting section 3 that cuts the carcass into pieces. The imaging components of the machine vision system 5 are covered by canopy 50, which may assist imaging of the carcass by excluding ambient light and which may also shield operators from stray emissions, such as X-rays, from the imaging components. Extending between the feeder 6, machine vision system 5 and cutting section 3 is a conveyor 2, which carries the carcass through each section in series. The conveyor 2 carries the carcass in a direction indicated by the axis 7. In this example, the conveyor carries the carcass from the feeder 6, through the machine vision system 5, to the cutting section 3.

The system 1 is suitable for cutting various carcasses or sections of carcass. In one example, the system 1 may be used to cut a side of an animal into three pieces, known as primals. In one example, the section of carcass to be processed is a pork side. References to carcass throughout the specification may refer to a substantially whole carcass or a section of a carcass, for example a side of a carcass.

The cutting section 3 includes a blade 31 (shown in FIGS. 3 and 4) and blade movement assembly 30. The blade 31 lies in a blade plane 8. The blade plane 8 is indicated in outline but in reality the plane 8 extends across the outlined area and continues in a plane beyond the outline. It will be understood that real blades have some thickness in a direction orthogonal to the blade plane and may have some features that project out of the plane. The blade plane 8 is the plane that best aligns with the generally planar shape of the portion of the blade 31 that is arranged to cut the carcass and does not require perfect planarity of the blade 31.

The meat processing system 1 rotates the blade 31 to adapt to different cut paths through carcasses that may be positioned or oriented differently from each other. When it is determined that a carcass should be cut at an angle to the direction of movement of the carcass on the conveyor 2, the blade 31 may be rotated with respect to the direction of movement such that, when the blade 31 is moved parallel to axis 10 during cutting, the blade plane 8 is aligned with the cut path to present the least resistance to cutting at this angle. This may reduce resistance to cutting, reduce lateral forces on the blade 31 and carcass during cutting, and increase the maximum angle at which a cut can be made.

The specific rotation of the blade 31 of this system 1 will be further detailed with reference to FIG. 2. In this figure, the blade (not shown in this view) lies in blade plane 8. In this plan view, the blade plane 8 appears as a line because it is oriented vertically. In some scenarios, the blade plane 8 could be oriented at an angle to the vertical. The carcass moves along axis 7 towards the cutting section 3. The blade movement assembly 30 is operated to rotate the blade such that the angle 9 between blade plane 8 and the axis 7 varies. In the case in which the intended cut path is parallel to the axis 7, the blade would not move laterally with respect to the axis 7 during cutting and the angle 9 would be set to 0°. In a case in which the intended cut path is at an angle to the axis 7, the blade may be translated parallel to axis 10 during cutting and the angle 9 may be set to match the angle of the intended cut path taken by the blade through the carcass.

Figure 2:
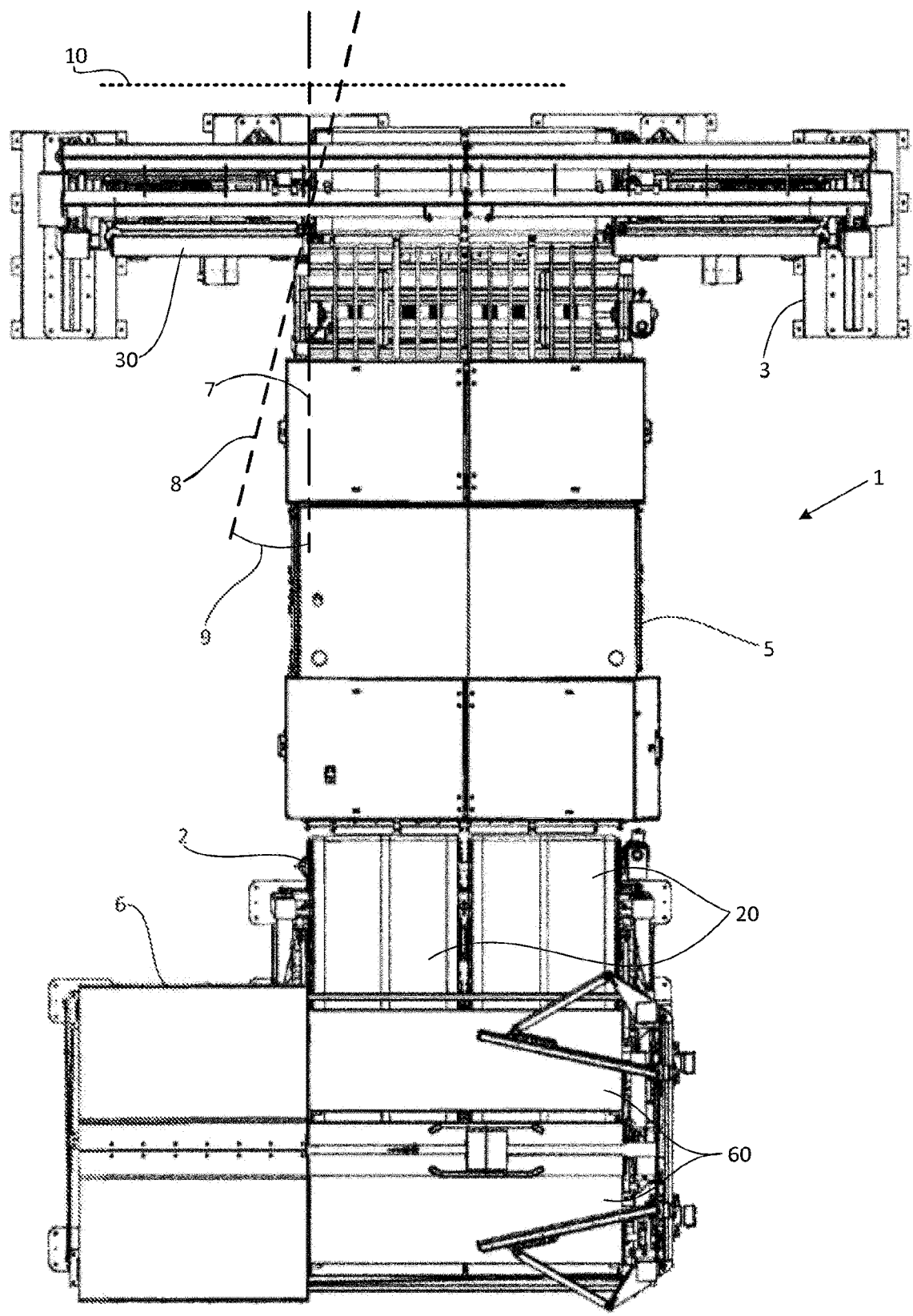
FIG. 2 is a plan view of a conveyor and cutting station of the meat processing system of FIG. 1.

In the embodiment shown in FIGS. 1 and 2, the conveyor 2 supports the carcass in a horizontal orientation on the conveyor 2 and conveys the carcass along the horizontal axis 7 towards a blade that can translate horizontally parallel to axis 10 during cutting. In this embodiment, the blade plane 8 extends largely in the vertical direction and the angle 9 is largely in the horizontal plane. In alternative embodiments, these orientations could be different. For example, a carcass could be conveyed along a horizontal path while hanging from a hook, with the carcass hanging substantially vertically during cutting. In this embodiment, the blade may be oriented largely horizontally and translated in the vertical direction during cutting. The variable angle between the blade plane and the axis along which the carcass is conveyed would be largely in the vertical plane in such an embodiment.

The feeder 6 of FIGS. 1 and 2 includes a tray 62, pusher bars 66 for removing the carcass from a gambrel, panels 61 and tilt tables 60. The carcass is initially brought to the feeder 6 suspended from a hook, known as a gambrel. When it reaches the pusher bars 66 it is pushed off the gambrel. The panels 61 may prevent the carcass moving too far sideways during removal from the gambrel. Once the carcass is removed from gambrel by the pusher bars 66, it falls to the tilt tables 60. The tilt tables 60 are able to tilt from the horizontal position, in which they receive the carcass, to an angled position to deposit the carcass onto the conveyor 2 below. The tilt tables may deposit the carcass on the conveyor with the carcass substantially perpendicular to the first axis, e.g. lying sideways across the conveyor.

The conveyor 2 is arranged to transport the carcass past the blade 31 of the cutting section 3. In this embodiment, the conveyor 2 forms a support surface for supporting the carcass while it is conveyed. The support surface is substantially horizontal to support a lying carcass. The conveyor 2 may include one or more belts and/or rollers. In the case of more than one belt or rollers, the upper surfaces of the belts and/or rollers taken together may make up the horizontal support surface. In the embodiment of FIGS. 1 and 2 the conveyor 2 includes a set of belts 20 that each cover a portion of the full conveyor path and at least one roller near each blade of the cutting section 3. The belts 20 are placed in series along the conveyor path close enough to each other to pass the carcass from one belt to the next. In this example, there are two rows of belts 20 placed side-by-side. The belts 20 are placed side-by-side close enough to each other to prevent the carcass falling between the belts 20.

Figure 3:
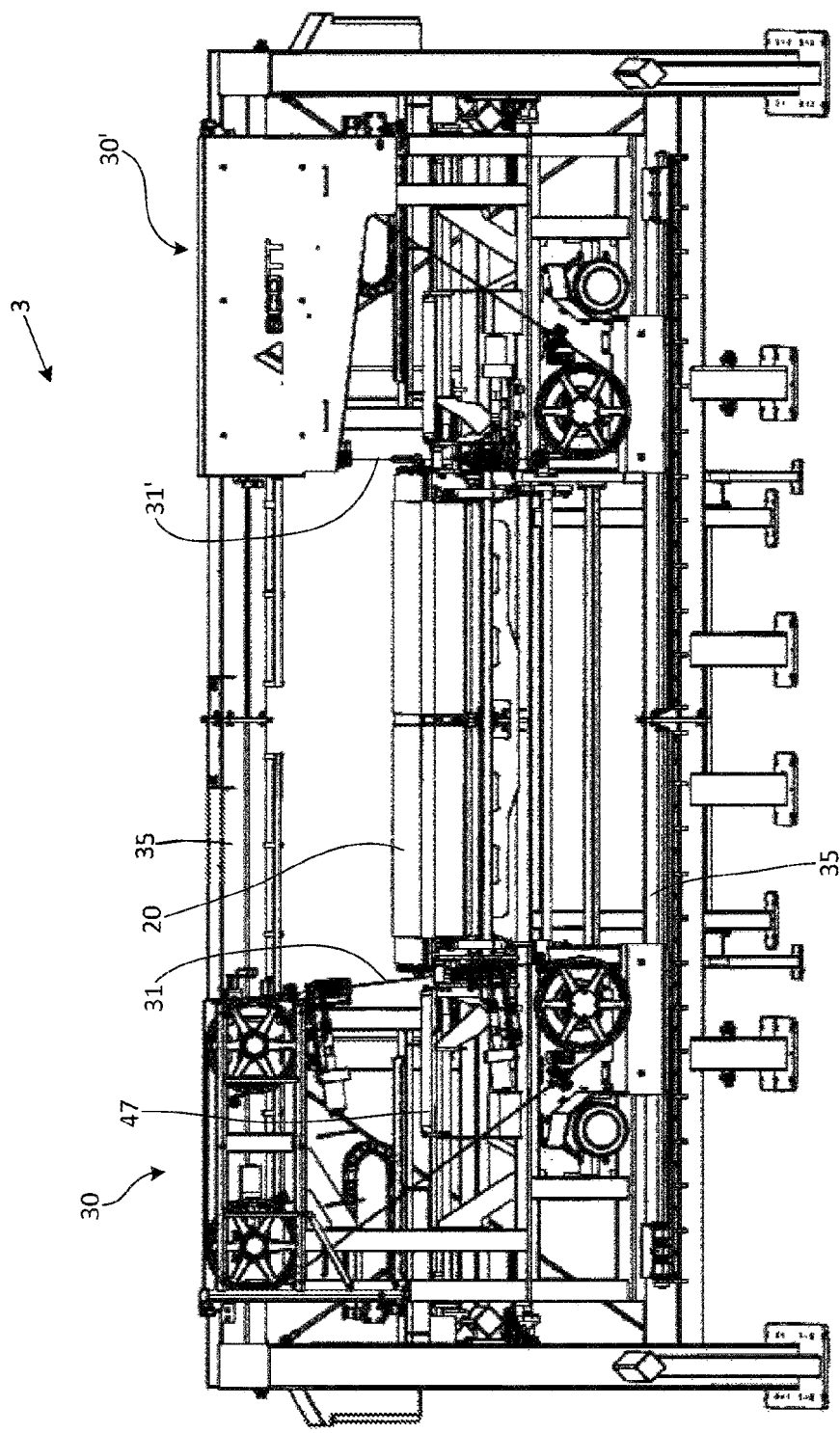
FIG. 3 is a front view of a cutting station of the meat processing system of FIGS. 1 and 2.

FIG. 3 shows the cutting section 3 in more detail. The cutting section 3 includes blade 31 and blade movement assembly 30. The conveyor also extends through the cutting section 3 to convey the carcass past the blade. In this example, the conveyor includes belts 20 located at least partly behind the blade 31. The conveyor also includes at least one roller 47 located at the outer side of each blade 31, i.e. the side away from the centre line of the conveyor. The roller(s) 47 may help support the carcass during cutting so that the carcass is supported on both sides of the blade 31. The cutting section 3 of FIG. 3 also includes a second blade 31' and second blade movement assembly 30'. The second blade 31' and second blade movement assembly 30' are similar to the blade 31 and blade movement assembly 30 defined in detail herein. In particular, the second blade 31' lies in a second blade plane and the second blade movement assembly 30' may rotate the second blade 31' to vary the angle between the second blade plane and the axis along which the carcass is conveyed and translate the second blade 31' to move the second blade plane transverse to the axis. Alternatively, the second blade 31' may be fixed or may only rotate or may only translate.

The blade movement assembly 30 in this example is carried on rails 35 to allow it to translate laterally with respect to the axis along which the carcass is conveyed. In the case that the cutting section 3 includes a second blade 31' and second blade movement assembly 30', the second blade movement assembly 30' may also be carried on the rails 35.

Figure 4:
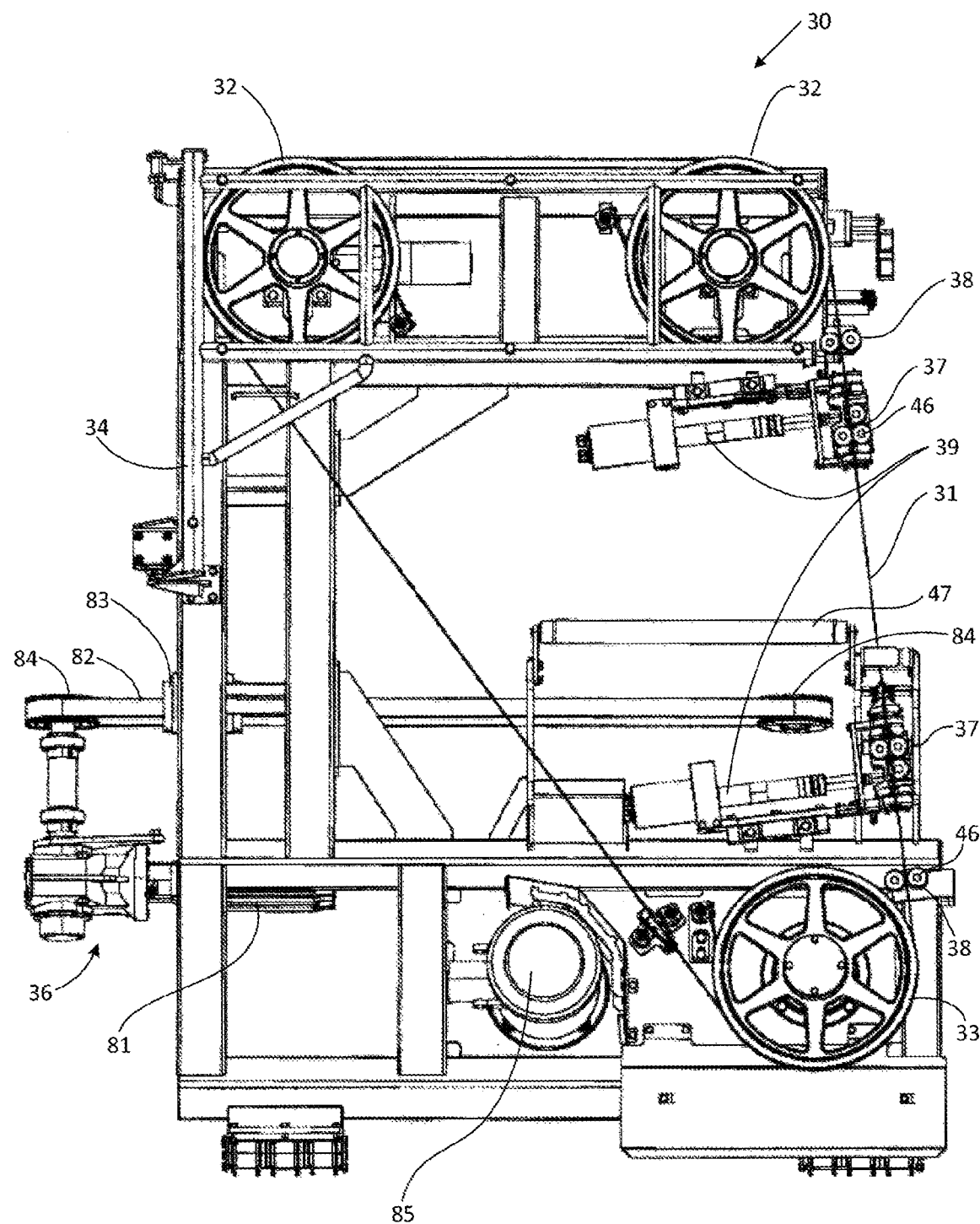
FIG. 4 is a front view of the blade and blade movement assembly of the meat processing system of FIGS. 1-3.

An exemplary blade movement assembly 30 is depicted in detail in FIG. 4. The blade movement assembly in this example includes a blade carrier assembly that carries the blade. Different blade carrier assemblies will be suited to different types of blades. In the case of a band blade, the blade carrier assembly could include two or more wheels that the blade passes around. In the case of a rotary blade, the blade carrier assembly could include a spindle and a bearing for the spindle. In the case of the rotary blade, a motor for driving the blade may also be mounted on the blade movement assembly so that the motor translates and/or rotates along with the blade.

The blade 31 in this example is a band blade. The band blade 31 could be a band knife blade or band saw blade. The blade 31 could include teeth or serrations. In this example, the band blade 31 is carried on wheels 32 and 33 such that wheels 32 and 33 make up the blade carrier. Wheel 33 is a driven wheel and wheels 32 are idler wheels. Wheel 33 is driven by motor 85. The idler wheels 32 are located above the support surface of the conveyor and the driven wheel 33 is located below the support surface of the conveyor. This means that the blade 31 extends above and below the support surface between the idler and driven wheels, which may enable it to cut right through the carcass to cut it into pieces rather than cut only part way into the carcass. The blade 31 is located between two successive sections of the conveyor, such as between two successive belts. This may allow the blade 31 to pass through the level of the support surface of the conveyor without interfering with the conveyor. Because the gap between belts extends laterally across the conveyor in this example, the blade 31 also has room to translate laterally (i.e. transverse to the direction of conveyance of the carcass) without interfering with the conveyor.

The blade movement assembly 30 may rotate the blade 31 by rotating the whole blade carrier assembly (possibly along with other elements such as the motor 85 and any blade guides) or by rotating the blade 31 or a part of the blade 31. Rotating the blade 31 or a part of the blade 31 may involve rotating a guide through which the blade 31 passes, thereby rotating the part of the blade 31 that extends through the guide. In the example of FIG. 4, the blade movement assembly 30 includes two rotatable blade guides 37. Each of these blade guides 37 includes rollers 46 either side of the blade 31 that restrain the blade 31 and set the angle of the portion of blade extending through and between the guides 37. The angle of the blade guides 37, and hence of the blade 31, can be controlled by the cylinders 39 which are each attached to a respective blade guide 37 at a point offset from the axis of rotation of the blade guide 37. Extending and contracting the cylinder 39 can rotate the blade guide 37 around this axis of rotation. In one example, the cylinders 39 are operated in concert with each other to set the blade 31 to a uniform angle between the blade guides 37.

Also provided in blade movement assembly 30 of FIG. 4 are fixed blade guides 38. Similar to the rotatable blade guides 37, these include rollers 46 either side of the blade 31 that restrain it at a particular angle. The fixed blade guides 38 in this example do not rotate to change the angle of the portion of blade 31 passing through them. Instead, they are set at a suitable angle for guiding the blade 31 onto and off of the wheels 32, 33. This means that the portion of the blade 31 between the rotatable blade guides 37 may be rotated through a range of angles by twisting of the blade 31 between the rotatable blade guides 37 and the fixed blade guides 38. The rest of the blade 31 beyond the fixed blade guides 38 may be substantially unaffecting by the twisting so that the blade 31 lies flat on the wheels 32, 33.

In an alternative embodiment, the blade carrier assembly as a whole may rotate to vary the angle of the blade. In this embodiment, the frame 34 may include a rotatable subframe on which is mounted the wheels 32, 33. In this example, there may be no need for rotatable guides 37. Fixed guides 38 may still be useful for controlling the angle or twist of the blade adjacent the wheels 32, 33.

The blade movement assembly may translate the blade by translating the whole blade carrier assembly or by translating the blade or a part of the blade. Translating the blade or a part thereof could involve translating blade guides. In the example of FIG. 4, the blade movement assembly 30 includes a frame 34, on which the wheels 32 and 33 of the blade carrier assembly are mounted, that can move along the rails (shown at 35 in FIG. 3) to translate the blade 31. The frame may include bearings to allow it to move along the rails 35. The blade movement assembly 30 also includes a linear drive 36 to drive the movement along the rails 35. In this example, the linear drive 36 includes a servo motor 81 driving a belt 82 that is carried by pulleys 84. The servo motor 81 and pulleys 84 are mounted to the rest of the cutting section (not shown in FIG. 4). Clamp plates 83 connect the frame 34 to the belt 82 such that the frame 34 and elements 31, 32, 33, 37, 38, 39, 46, 47, and 85 that are ultimately mounted on the frame 34 move back and forth along the rails 35 as the servo motor 81 drives the belt clockwise and anticlockwise around the pulleys 84.

Also shown in this Figure is one of the rollers 47 which may support the carcass during cutting.

Figure 5A:
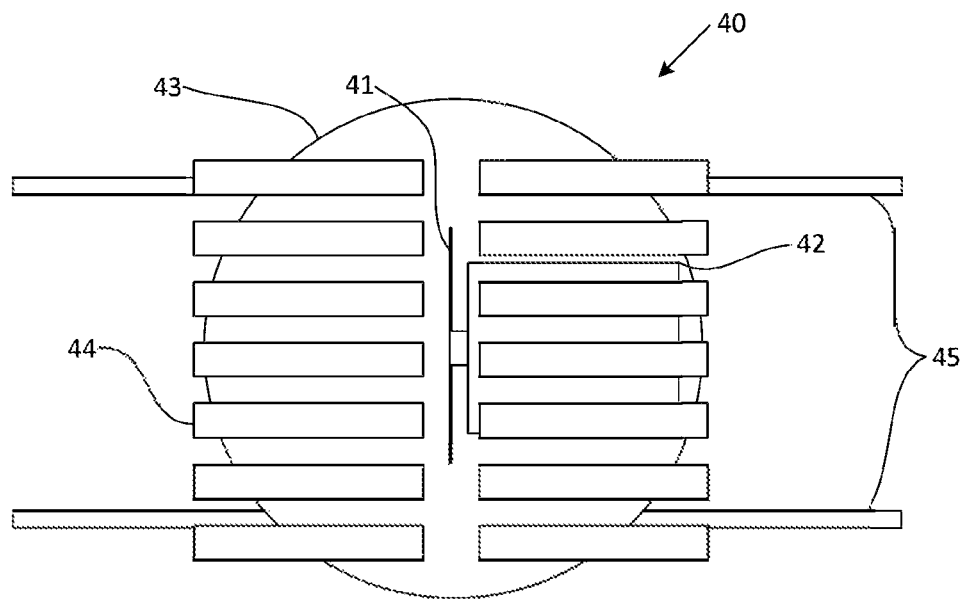
FIG. 5A is a plan view of an alternative blade, blade movement assembly and conveyor with the blade at one angle.
Figure 5B:
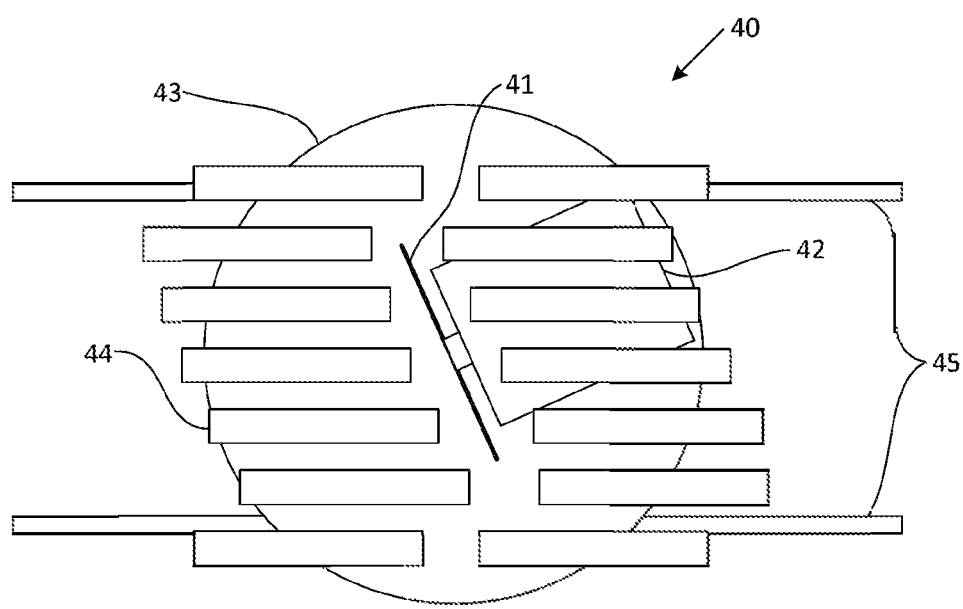
FIG. 5B is a plan view of the blade, blade movement assembly and conveyor of FIG. 5A with the blade at another angle.

In the alternative arrangement of FIGS. 5A and 5B, the blade is a rotary blade 41. The rotary blade 41 may be a rotary knife or a rotary saw. The rotary blade 41 may have serrations or teeth. The blade movement assembly 43 in this example may be in the form of a turntable on which the rotary blade 41 is mounted via motor 42. The angle of the rotary blade 41 may be varied by rotating the turntable 43. In FIG. 5A, the rotary blade 41 is at a first angle which would correspond to a 0° angle 9 between the blade plane 8 and the axis 7 along which the carcass is conveyed by the conveyor. In FIG. 5B, the rotary blade 41 is at a second angle which would correspond to a non-zero angle 9 between the blade plane 8 and the axis 7 along which the carcass is conveyed by the conveyor.

The blade movement assembly of a rotary blade may also be able to translate the blade laterally with respect to the axis along which the carcass is conveyed by the conveyor. In the example of FIGS. 5A and 5B, the turntable 43 may be mounted on rails 45 provided in the cutting section. The turntable 43 may then move along the rails 45 to translate the motor 42 and the rotary blade 41. In another example, the blade motor may be mounted to the turntable on rails provided on the turntable. The motor may then move along the rails to translate the blade while the turntable stays in a fixed position.

In the example of FIGS. 5A and 5B, the conveyor includes rollers 44 to convey the carcass past the rotary blade 41. The rollers 44 together define the horizontal support surface that supports the carcass. The rotary blade 41 is located between rows of rollers 44 and protrudes upwards above the rollers 44 to a position suitable for cutting the carcass as it is conveyed on the rollers 44. The rollers 44 are movable within the plane of the horizontal support surface so that, when the angle or position of the rotary blade 41 varies, the rollers 44 move to accommodate the rotary blade 41 at different angles and/or positions. Specifically, the rollers 44 may move to maintain a separation between each roller 44 and the rotary blade 41 that is between a minimum allowed value and a maximum allowed value. When a portion of the rotary blade 41 moves towards a roller 44, that roller 44 may move away to maintain at least the minimum separation. When a portion of the rotary blade 41 moves away from a roller 44, that roller 44 may move towards the rotary blade 41 to keep the separation at or below the maximum separation. The rollers may roll on telescoping shafts that can extend or retract to move the rollers towards and away from the blade.

This movement of the rollers 44 may be driven by movement of the turntable 43, such as translation or rotation. The rotation may be about an axis passing through the blade, for example through the centre of the blade. In one example, the rollers 44 may be mounted separately on linear guideways. The rollers 44 may be slid back and forth on the guideways by parallel motion linkages connected to the turntable 43 to convert rotation and/or translation of the turntable 43 into translation of the rollers. In an alternative example, the linkages may be connected to another part of the rotary blade assembly to cause movement of the rollers 44 upon rotation and/or translation of the blade 41.

Figure 6:
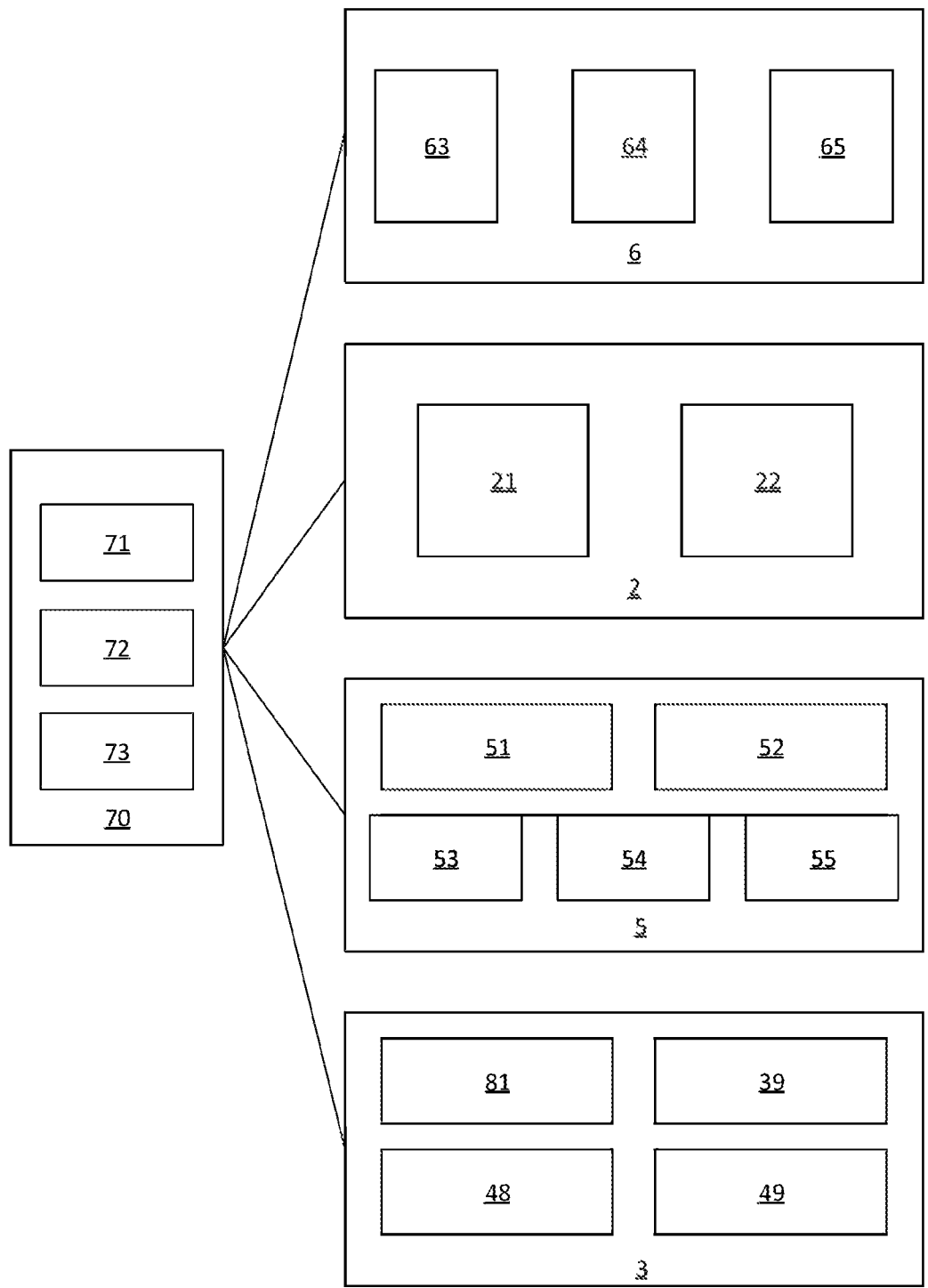
FIG. 6 is a schematic diagram of a control system in accordance with one example.

Operation of the meat processing system may be coordinated by a controller in combination with sensors and actuators. In the embodiment of FIG. 6, a controller 70 is in communication with the feeder 6, conveyor 2, machine vision system 5 and cutting section 3 to control operation of the system.

The controller 70 includes memory 71, processing circuitry 72 and user interface 73. The memory 71 may store machine-readable instructions for carrying out any of the operations of the controller 70 or operations of the other parts of the system under control of the controller 70. The memory 71 may be any suitable machine-readable medium, may be volatile or non-volatile and may store the instructions in a transitory or non-transitory form. The processing circuitry 72 may be any suitable device or circuitry for carrying out the instructions stored in the memory 71 and may be made up of a single device or an array of devices. The user interface 73 may include hardware, software or a combination of hardware and software. The user interface 73 may include input or output devices. The input devices may include switches, buttons, keypads or touchscreens, for example. The output devices may include visual display screens or speakers.

The feeder 6 of FIG. 6 includes a movable platform actuator 64 that drives the movable platform (shown as 62 in FIG. 1) from the carcass-receiving position toward the tilt tables to deposit the carcass on the tilt tables. The controller 70 may control this operation of the movable platform actuator. The controller 70 may control the actuator 64 to move the platform upon detection of a carcass being located on the movable platform, for example using sensor 65, or at predetermined times at which a carcass is expected on the movable platform.

The feeder 6 also includes a tilt table actuator 63 that drives the tilt table between the horizontal disposition in which it supports the carcass and the tilted disposition in which it dumps the carcass onto the conveyor 2. The controller 70 may control the tilt table actuator to tilt the table based on one or more of: detection of a carcass on the tilt table; detection that there is no carcass on a portion of the conveyor near the tilt table; or at predetermined times.

The conveyor 2 includes a conveyor motor 21 and a speed sensor 22. The controller 70 may control the conveyor motor 21 to start or stop the conveyor 2. In one example, this could be under manual control of a human operator via the user interface 73. The controller 70 may also set the speed of the conveyor 2. Different speeds may be suitable for different types of blade, carcasses of difference species, frozen or fresh carcasses, or different intended cut angles. The controller 70 may use feedback from the speed sensor 22 to regulate the speed of the conveyor motor 21 about a set point. For example, the controller 70 may include a proportional-integral-derivative control algorithm to produce drive signals to the motor 21 based on differences between the desired set point and the output of the speed sensor 22.

The machine vision system 5 includes a laser scanner 51 and an X-ray system 52. The machine vision system 5 may also include a visible light camera 54. The laser scanner 51 and X-ray system 52 may operate continuously, periodically, or upon detection of a carcass by presence sensor 53. The controller 70 may control the operation of the laser scanner 51 and X-ray system 52 to produce scan data and X-ray data. The laser scanner data may be used to determine the 3-dimensional shape of the surface of the carcass using laser ranging techniques. The laser scanner 51 may use an infrared laser. The X-ray system 52 may be used to image the bones of the carcass. In one example, the X-ray system 52 includes two X-ray imaging devices. This may enable relatively small, commonly available X-ray devices to image the full length of a relatively long carcass, such as that of a pig. This may also allow the positions and orientations of the bones to be determined in three dimensions if the two X-ray imaging devices image the same portion of the carcass from different perspectives. The machine vision system 5 may also include a cut imaging device 55 arranged to image the carcass and blades of the cutting section 3 as the carcass reaches the blades. The controller 70 may use this image data to determine when the carcass reaches each blade. The controller 70 may also use this image data to monitor the cutting operation, for example to ensure that the blade is tracking along the cut path correctly and/or to ensure the position or orientation of the carcass does not change too much during cutting. The controller 70 may use object-recognition algorithms to identify the blades and carcass in the image data.

Upon receiving the scan data and X-ray data, the controller 70 may analyse these data to determine the position and orientation of the carcass, including the positions and orientations of bones of the carcass. Based on the position and orientation of the carcass and/or bones, the controller 70 may determine a suitable cut path through the carcass. This analysis and cut path determination may be performed autonomously by the controller 70 or based on input from a user. For example, the controller 70 may present information from one or more of the laser scanner 51, X-ray system 52 and visible light camera 54 on a display screen of the user interface 73 and allow a user to input a desired cut path based on the information. In one example, this may involve presenting a 3D model of the carcass showing the bone positions and allowing a user to draw a desired cut path on the model. A second cut path may also be determined in the case that the cutting section 3 includes a second blade, and so on for further blades and cut paths.

Once the cut path is determined, the controller 70 controls the operation of the cutting section 3 to cut along the cut path. The cutting section includes, as part of the blade movement assembly detailed previously, servo motor 81, blade guide rotation cylinders 39, position sensor 48 and blade angle sensor 49. The controller 70 controls the servo motor 81 to translate the blade to the correct starting point for cutting along the cut path. The controller 70 may use feedback from the position sensor 48 to determine when the blade is at its correct starting point. The controller 70 controls the cylinders 39 to rotate the blade and set the correct initial angle between the blade plane and the axis along which the carcass is conveyed. The controller 70 may use feedback from the blade angle sensor 49 to determine when the blade is at the correct angle. The controller 70 may control the servo motor 81 to start translating the blade to follow the cut path when the controller 70 determines that the carcass has reached the blade. The carcass reaching the blade may be determined from image data produced by the cut imaging device 55, from back emf of the blade motor 85, from timing data based on the expected travel time of the carcass between an upstream part of the system (such as the machine vision system or the tilt table) at which the carcass was previously known to be present and the blade, or from the output of an object detector such as a laser beam-break sensor with a beam directed in front of the blade.

In the alternative embodiment in which the blade is a rotary blade, the angle of the blade may be controlled by a mechanism other that the cylinders 39. For example, the rotary blade may be mounted on a turntable as shown in FIGS. 5A and 5B and the turntable may be rotated, under control of the controller 70, to control the angle of the blade. Similarly, the turntable may translated to translate the blade, or the blade may be translated with respect to the turntable, under control of the controller 70.

The speed at which the servo motor 81 translates the blade during cutting may be controlled based on the angle of the cut path and the speed of the conveyor 2. The direction that the servo motor 81 operates to drive the blade is also controlled such that the translation is in the right direction for the blade to follow the cut path. The controller 70 may use the output of the speed sensor 22 and the desired angle of the current portion of the cut path to control the speed of translation of the blade according to the formula:

$$v_t = v_c \tan \Theta;$$

where $v_t$ is the speed of translation; $v_c$ is the conveyor speed; and $\Theta$ is the angle of the relevant portion of the cut path. The controller 70 may use successive measurements from the position sensor 48 over time to determine the actual speed of translation of the blade. The controller 70 may use the determined actual speed as feedback to control the drive signals to the servo motor 81 to regulate the speed about $v_t$.

The angle of the blade may be set to the angle of the current portion of the cut path.

As mentioned previously, the cut path may be non-linear so the speed of translation and angle of the blade may change during the cutting process. In this case, the speed of translation $v_t$ and blade angle may change as $\Theta$ changes along the cut path. The speed of the conveyor $v_c$ may also change during the cutting process, for example due to resistance between the carcass and the blade being transferred to the conveyor. In this case, the speed of translation $v_t$ may change as $v_c$ changes during the cutting process.

An exemplary method of operating the processing system proceeds as follows. Reference is made to features of FIGS. 1-4 and 6. Initially, a carcass is delivered to the feeder 6 on a gambrel. The carcass is pushed from the gambrel by pusher bars 66 and panels 61 and falls onto the tilt table 60. The tilt table 60 then tilts to deposit the carcass on the conveyor 2. The conveyor 2 conveys the carcass along axis 7 towards the machine vision system 5. In the machine vision system 5, the presence of the carcass is detected by the presence detector 53. This is reported to the controller 70, which then controls the laser scanner 51 to take measurements of the surface of the carcass and the X-ray system 52 to image the bones of the carcass. The controller 70 analyses the outputs of the laser scanner 51 and X-ray system 52 to determine the position and orientation of the carcass and the positions and orientations of certain bones in the carcass or other features of the carcass. Based on this determination, the controller 70 determines a suitable cut path through the carcass. This may be based on anatomical information relating the locations of certain muscle groups or cuts of meat for the particular species of animal to the determined positions of bones of the animal. This may also be based on optimal cut angles with respect to the orientation of the carcass or of certain bones. The controller 70 also determines the location of the cut path in space based on the determined location of the carcass on the conveyor 2. The controller 70 may also determine a second cut path for a second blade.

The carcass is conveyed from the machine vision system 5 to the cutting section 3 and past the blade 31 to be cut into pieces. During cutting, the blade movement assembly 30 is controlled to translate the blade plane 8 transverse to the axis 7 parallel to axis 10 such that the blade 31 follows the cut path. Prior to and/or during cutting the controller 70 controls the blade movement assembly 30 to rotate the blade 31 such that its blade plane 8 is aligned with the cut path throughout the cutting process. Specifically, the controller 70 determines the required speed and direction of translation of the blade 31 based on the angle of the portion of the cut path that the blade 31 is currently at. If the angle of the cut path changes along the path, the speed of translation will correspondingly change, as will the angle 9 of the blade 31. If the speed of the conveyor 2 changes, the speed of translation will correspondingly change. The controller 70 may also control the second blade movement assembly 30' to follow the second cut path. As the blade 31 completes the cut path, the blade exits the carcass, which has now been cut into separate pieces. In the case of a side of an animal cut by two blades 31 and 31', the side may be cut into three primals. The pieces may now be collected for packaging or further processing.

There are thus provided systems and methods that may allow carcasses of different positions and orientations to be cut consistently in a mechanised system that uses a conveyor to convey the carcass past a blade. The systems and methods may also reduce resistance to cutting at an angle, reduce lateral forces on the carcass during cutting, and provide the ability to cut at a large angle to the direction in which the carcasses are conveyed past the blade.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A meat processing system comprising:
   a blade configured to cut a carcass or section of carcass into pieces, the blade lying substantially in a blade plane;
   a blade movement assembly;
   a controller; and
   a conveyor configured to convey the carcass or section of carcass along a first axis; wherein:
   the controller is configured to control the blade movement assembly to rotate the blade or a portion of the blade to vary an angle between the blade plane and the first axis;

the conveyor forms a support surface for supporting the carcass or section of the carcass while it is conveyed; and the blade extends above and below the support surface.

2. The meat processing system of claim 1 wherein the blade movement assembly is further configured to translate the blade to move the blade transverse to the first axis.

3. The meat processing system of claim 2 wherein the blade movement assembly is configured to rotate the blade to align the blade plane with a predetermined cut path through the carcass or section of carcass.

4. The meat processing system of claim 3 wherein the blade movement assembly is configured to translate the blade at a speed that depends on the speed at which the carcass or section of carcass is conveyed.

5. The meat processing system of claim 3 wherein the cut path is non-linear.

6. The meat processing system of claim 1 wherein the blade movement assembly comprises one or more blade guides through which the blade extends, wherein the blade guide(s) are configured to rotate a portion of the blade that extends through the blade guide(s).

7. The meat processing system of claim 1 wherein the blade movement assembly comprises a blade carrier assembly including two or more wheels which carry the blade, wherein the blade carrier assembly is configured to rotate to rotate the blade.

8. The meat processing system of claim 1, wherein:
the blade is a rotary blade; and
the meat processing system further comprises a motor that is configured to drive the rotary blade and a turntable that is configured to support the rotary blade and the motor, wherein the blade movement assembly is configured to rotate the turntable to rotate the blade.

9. The meat processing system of claim 1, wherein the blade movement assembly comprises a linear drive configured to translate the blade to move the blade transverse to the first axis.

10. The meat processing system of claim 1, further comprising a second blade configured to cut the carcass or section of carcass into pieces; and
a second blade movement assembly;
wherein the second blade lies in a second blade plane and wherein the second blade movement assembly is configured to rotate the second blade to vary an angle between the second blade plane and the first axis and/or to translate the second blade to move the second blade plane transverse to the first axis.

11. The meat processing system of claim 1, wherein the support surface is substantially horizontal.

12. The meat processing system of claim 1, wherein the conveyor comprises a first conveyor belt or roller and a second conveyor belt or roller and wherein the blade extends between the first conveyor belt or roller and the second conveyor belt or roller.

13. The meat processing system of claim 1 wherein the conveyor comprises a plurality of rollers; and
one or more of the rollers are configured to move in the plane of the horizontal support surface upon rotation or translation of the blade to accommodate a range of blade angles or positions.

14. The meat processing system of claim 1 further comprising a machine vision system to determine a position and/or orientation of the carcass or section of carcass.

15. The meat processing system of claim 14 further comprising processing circuitry configured to control the operation of the blade movement assembly based on output from the machine vision system.

16. The meat processing system of claim 14 wherein the machine vision system includes a 3D image sensor.

17. The meat processing system of claim 16 wherein the 3D image sensor is a laser scanner.

18. The meat processing system of claim 14 wherein the machine vision system comprises an X-ray device.

19. The meat processing system of claim 18 further comprising processing circuitry configured to determine a position and/or orientation of a bone of the carcass or section of carcass based on output from the X-ray device.

* * * * *